United States Patent Office 3,513,181
Patented May 19, 1970

3,513,181
METHOD OF PREPARING NEW QUATERNARY PHOSPHONIUM COMPOUNDS
Aart Noordermeer, Puister Willem, and Petrus Gerardus Johannes Wesselman, Van Houtenaan, Weesp, Netherlands, assignors, by mesne assignments, to U.S. Philips Corporation, New York, N.Y., a corporation of Delaware
No Drawing. Filed May 17, 1967, Ser. No. 644,751
Int. Cl. C07f 5/00, 7/00, 9/00
U.S. Cl. 260—429.5                31 Claims

ABSTRACT OF THE DISCLOSURE

Method of preparation of phosphonium compounds by the reaction of a trialkyl or triaryl phosphine with an electron acceptor and a compound of the formula

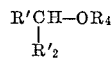

wherein R' is an $\alpha,\beta$-unsaturated hydrocarbon moiety, R'$_2$ is hydrogen or a hydrocarbon moiety and R$_4$ is hydrogen, an acyl group or the radical of the reaction of a metal hydride and a carbonyl containing organic compound for example the radical —Al(C$_2$H$_5$)$_2$.

---

The invention relates to a method of preparing new quaternary phosphonium compounds.

It is known that quaternary trialkyl- and triarylphosphonium compounds may be used as reagents in so-called Wittig reactions, in which compounds having a double carbon-carbon bond are created. In these reactions, a phosphorane which is obtained from the corresponding quaternary phosphonium compound by means of a base is reacted with an oxo compound or an azomethin.

In Dutch patent specification 101,856 it is described that quaternary phosphonium compounds which may be used in such reactions can be prepared from alcohols and triaryl phosphine hydrohalogenides.

According to Dutch patent application 6405660 quaternary phosphonium compounds may also be obtained from an esterified alcohol and a hydrosalt of a triaryl phosphine and from such an alcohol, a triaryl phosphine and an acid, for example, a hydrohalogenic acid, from which a salt can be formed with the triaryl phosphine.

It has surprisingly been found that quaternary phosphonium compounds can also be prepared without protons being present. In fact it has been found that quaternary phosphonium compounds can be prepared with a trialkyl-, triaryl or mixed alkyl-aryl-phosphine in the presence of an electron acceptor and this not only from alcohols or esterified alcohols but also from the complex compounds which are obtained intermediately in the reduction of acids, esters, ketones and aldehydes with metal hydrides, for example, dialkyl aluminium hydrides.

The new quaternary phosphonium compounds prepared according to this method have the advantage over the known compounds of having a larger reactivity.

In addition it was found that the new phosphonium compounds are obtained not only more rapidly but also with higher yields than the corresponding known phosphonium compounds.

Moreover it was found that condensation reactions between these phosphonium compounds and oxo compounds can be carried out with higher yields.

An additional advantage is that in preparing these compounds, in contrast with what is the case in the known preparation from alcohols, no water is set free which may give rise to side reactions.

In the reduction of, for example, aldehydes with dialkyl hydrides the complex compound which is obtained intermediately must be hydrolyzed with water to obtain the corresponding alcohol. In some cases it may be difficult to remove the excess of water subsequently completely from the alcohol. The result of this is that, if the resulting alcohol is used for preparing phosphonium compounds, undesired side reactions may occur. It consequently is an advantage of the method according to the invention that the intermediately obtained reduction complex can directly be converted into a quaternary phosphonium compound.

In agreement herewith the invention relates to a method of preparing new quaternary phosphonium compounds, characterized in that quaternary phosphonium compounds of the Formula I.

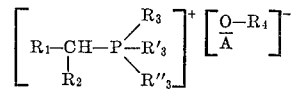                I in which formula R$_1$ is an $\alpha$-$\beta$ unsaturated substituted or unsubstituted alkenyl-, cycloalkenyl- or aralkenyl group or a substituted or unsubstituted aryl group and R$_2$ is a hydrogen atom, a saturated or unsaturated, substituted or unsubstituted, alkyl-, cycloalkyl- or aralkyl group or a substituted or unsubstituted aryl group and R$_1$ or R$_2$ in addition may contain a phosphonium group, R$_3$, R'$_3$ and R''$_3$ represent an alkyl group or an aryl group, which latter may be substituted with alkyl or alkoxy, R$_4$ is a hydrogen atom or an acyl group or is the radical B of a metal hydride formed during the reduction of an aldehyde, ketone, acid or ester and A is an electron acceptor, are prepared by reacting a compound of the Formula II

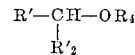   II in which formula R$_4$ has the same meaning as in Formula I and R' and R'$_2$ have the same meanings as R$_1$ and R$_2$ or instead of a phosphonium group may contain a group OR$_4$, with a compound of Formula III

   III in which formulae the symbols have the same meanings as in Formula I, and an electron acceptor A.

As examples of compounds prepared according to the invention may be mentioned:

(1) BF$_3$-adduct of benzylidene triphenyl phosphonium hydroxide.

(2) AlCl$_3$-adduct of (m.methoxy phenylethylidene)-(methyl) methylidene tri-n-butyl phosphonium acetate.

(3) SnCl$_4$-adduct of 3-cyanopropene-2-ylidene-tribenzyl-phosphonium hydroxide.

(4) SnCl$_4$-adduct of 3-cyclohexylpropene-2-ylidene-trianisyl phosphonium acetate.

(5) BF$_3$-adduct of (phenyl)(phenylethyl)methylidene triphenylphosphonium hydroxide.

(6) BF$_3$-adduct of 1-phenylpentylidene tri-n-butyl phosphoniumpalmitate.

(7) SnCl$_4$-adduct of (p.ethylphenyl)(2-cyclohexylethenyl)methylidene tri-p.tolylphosphonium hydroxide.

(8) BF$_3$-adduct of n-hexylidene triphenyl phosphonium butyrate.

(9) di-BF$_3$-adduct of (butene-2-ylidene)-1,4-bis(triphenylphosphonium hydroxide).

(10) di-SnCl$_4$-adduct of phenyl-1,4-dimethylidene-bis-(tri-n-butyl phosphonium acetate).

An electron acceptor is to be understood to mean herein a compound which is capable of entering into a dative covalent bond with a compound which contains an atom having a free electron pair. As examples of such electron acceptor compounds may be mentioned, for example, $BF_3$, $SnCl_4$ and $AlCl_3$. In addition may be mentioned $FeCl_3$, $P_2O_5$, $CdCl_2$, $AlBr_3$, $ZnCl_2$, $PCl_5$, $HgCl_2$, $AlF_3$, $GaCl_3$, $BCl_3$, $B(CH_3)_3$ and $CoCl_3$, $Ni_2O_3$, $TiCl_4$, $V_2O_5$, $Cr_2O_3$, $SbCl_5$ and $SbF_5$.

In phosphines of Formula III, $R_3$, $R'_3$ and $R''_3$ may represent an alkyl group, for example, a methyl group or a butyl group or an aryl group, for example, naphthyl, anisyl, tolyl. A phenyl group is to be preferred, however.

Of the metal hydrides which may be used in the reduction of esters, acids, aldehydes or ketones should be mentioned by name in particular, dialkyl aluminum hydrides, for example, di-isobutyl aluminum hydride. The radical B of this hydride has the following structure.

$$-Al[CH_2CH(CH_3)_2]_2$$

Other metal hydrides which are to be considered are $LiAlH_4$, $Mg(AlH_4)_2$, $Al(BH_4)_3$, $$NaAl[CH_2CH(CH_3)_3]_2H_2$$

$(C_2H_5O)_3AlHLi$ and $(C_2H_5O)_3AlHNa$.

Besides a hydrogen atom and the above described radical B, $R_4$ may also represent an acyl group, for example, an acetyl group, a benzoyl group, or a palmityl group, as may be the case if a phosphonium compound is prepared from vitamin A palmitate.

Examples of the meanings of $R_2$ are an alkyl group, for example, a methyl group, a butyl group or a dodecyl group, an aryl group, for example, a phenyl group, a naphthyl group, a tolyl group, an aralkyl group, for example, benzyl group or phenetyl group, an unsaturated alkyl group and aralkyl group, for example, a styryl group, a propenyl gronp or a pentenyl group. These groups may be substituted with a carboxyl group, a hydroxyl group, a carbonyl group, a nitrile group and similar groups. Examples of meanings of $R_1$ are: phenyl, 2,6,6-trimethyl-cyclohexene-1-yl, allyl and 2(2,6,6-trimethyl cyclohexene-1-yl-1) ethenyl. $R_1$ and $R_2$ together may form a cyclic group.

However, the invention especially relates to the preparation of those phosphonium compounds, in which $R_1$ is a conjugated polyene group and more especially to the preparation of phosphonium compounds, in which $R_1$ and $R_2$ together with the carbon atoms to which they are bound represent the polyene skeleton of vitamin A or the polyene skeleton which is closely related thereto. In this case, inter alia both longer and shorter polyene chains can be considered, for example, the β-ionylidene group or citrylidene, but also such groups which are substituted in the cyclohexenyl nucleus with hydroxy, alkoxy or oxy.

The method according to the invention is preferably carried out in a suitable solvent or diluent, for example, benzene and toluene, halogenated hydrocarbons, for example, dichloroethanes and chlorobenzene, in addition in ethers, such as diethyl ether and tetrahydrofurane, and in dimethyl sulphoxide, dimethyl formamide, and the like.

The reaction temperature may vary within rather wide limits and will generally lie between —50° C. and +100° C., as a rule between 0° C. and +50° C.

The reaction may be carried out so that an electron acceptor is added to a mixture of a substance of Formula II and a phosphine of Formula III but alternately a mixture of an electron acceptor and a phosphine may be mixed with a compound of Formula II.

In order that the invention may readily be carried into effect, it will now be described in greater detail, by way of example, with reference to the following specific examples. All the processes described in these examples were carried out in a nitrogen atmosphere at room temperature.

EXAMPLE 1

7.1 gms. (0.025 mol) of crystalline vitamin A and 6.55 gms. (0.025 mol) of triphenylphosphine were dissolved in 200 mls. of absolute toluene, 3.5 mls. (0.025 mol) of $BF_3$-diethyletherate were added with vigorous stirring, and the reaction mixture was stirred at room temperature for one hour. The resulting $BF_3$-addition product of axerophtylidene-triphenylphosphonium hydroxide was characterized by means of the IR and UV-spectra. Yield 99%. The substance was used as a reagent in the following coupling reaction. 7.1 mgs. of crystalline vitamin A aldehyde were added to the reaction mixture after which it was stirred until a homogeneous solution was obtained. Then a solution of 10 gms. of KOH in 50 mls. of methanol was added within 10 minutes with vigorous stirring. The reaction mixture obtained an intensely red colour. Stirring was continued for another five minutes. The reaction mixture was transferred to a separatory funnel of 1 l., washed two times with 250 mls. of 2 N sulphuric acid and three times with 250 mls. of water. After filtration through a water repellent filter, the volume was made up to 500 mls. in a measuring flask and the yield was determined by means of the extinction at 448 mm. Yield 84% of β-carotene calculated on the phosphonium compound.

EXAMPLE 2

8.2 gms. of crystalline vitamin A acetate (0.025 mol) and 6.55 gms. (0.025 mol) of triphenylphosphine were dissolved in 200 mls. of absolute benzene, 3.5 mls. of boriumtrifluoride-diethyletherate were added with vigorous stirring and the reaction mixture was stirred at room temperature for another two hours. The resulting $BF_3$-addition product of axerophtylidene triphenylphosphonium acetate was characterized by means of the IR and UV spectra. Yield 97%. The substance may be coupled as follows with vitamin A aldehyde. To the homogeneous pale brown solution were added 7.1 gms. (0.025 mol) of crystalline vitamin A aldehyde, after which the mixture was stirred until a homogeneous solution was obtained. The solution of 10 gms. of KOH in 50 mls. of methanol was added dropwise to the reaction mixture with vigorous stirring within 10 minutes. The mixture was stirred for another 5 minutes after which it was processed according to the method described in Example 1. Yield 80% calculated on the phosphonium compound.

EXAMPLE 3

7.9 gms. of crystalline vitamin A acid methyl ester were dissolved in 100 mls. of absolute benzene. A solution of 11 mls. (2.2 equivalent) of di-isobutylaluminiumhydride in 100 mls. of absolute benzene was added dropwise, while stirring, after which the mixture was stirred at room temperature for 10 minutes, 6.55 gms. of triphenyl phosphine were then dissolved in the reaction mixture and 3.5 mls. of borium trifluoride diethyl etherate were added dropwise to the bright yellow homogeneous solution, while stirring thoroughly, after which the mixture was stirred at room temperature for another two hours. A compound of Formula I was obtained in which $R_1$, $R_2$ and the carbon atom to which they are bound together represent the axerophtylidene group, $R_3$, $R'_3$ and $R''_3$ represent a phenyl group, A is $BF_3$ and $R_4$ is the group $$-Al-[CH_2CH(CH_3)_2]_2$$

The substance was characterized with UV and IR spectra, yield 98%, and coupled to vitamin A aldehyde as follows: 7.1 gms. of vitamin A aldehyde were dissolved in the reaction mixture after which a solution of 10 gms. of KOH in 50 mls. of methanol was added dropwise with vigorous stirring. The reaction runs off strongly isothermally. During the addition of the KOH solution, an intensely red discoloration occurred. The reaction mixture was stirred for another five minutes, after which it was processed entirely according to the method described in Example 1. The yield of β-carotene was 57%.

EXAMPLE 4

7.1 gms. of crystalline vitamin A (0.025 mol) and 6.55 gms. of triphenylphosphine (0.024 mol) were dissolved in 200 mls. of absolute benzene. 3.32 gms. (0.025 mol) of anhydrous AlCl₃ were added to the reaction mixture after which it was stirred at room temperature for 1 hour. A pale brown solution was obtained. The resulting AlCl₃ addition product of axerophtylidenetriphenylphosphonium hydroxide was characterized in the normal manner after which the substance was coupled with vitamin A aldehyde. 7.1 gms. of crystalline vitamin A aldehyde were dissolved in the reaction mixture after which a solution of 10 gms. of KOH in 50 mls. of methanol was added dropwise in 10 minutes while stirring thoroughly. Stirring was continued for another 5 minutes, after which the mixture was processed in the manner described in Example 1. The yield of $\beta$-carotene was 38%.

EXAMPLE 5

7.1 gms. of crystalline vitamin A aldehyde were dissolved in 100 mls. of absolute benzene. A solution of 5 mls. (1 eq.) of di-isobutylaluminiumhydride in 100 mls. of absolute benzene was added dropwise while stirring, after which the mixture was stirred for another 10 minutes at room temperature. 6.55 gms. of triphenylphosphine were added to the reaction mixture after which 3.5 mls. of borium trifluoride diethyl etherate were added with vigorous stirring. The solution was stirred for another 2 hours. The resulting addition product was identical to that obtained in Example 3. Yield 100%. It was coupled to vitamin A aldehyde in an analogous manner. Yield of $\beta$-carotene 62%.

EXAMPLE 6

Preparation of BF₃ addition product of axerophthyl (triphenyl) phosphonium-LiAlH₄-reduction complex 28.4 gms. of crystalline all-trans $\beta_{20}$-aldehyde were dissolved in 500 mls. of absolute ether and reduced by stirring for two hours with 1 gm. of LiAlH₄.

The reduction complex was then transferred to 500 mls. of 1,2-dichloroethane in vacuo at maximally 30° C. after which were added successively 26.2 gms. of triphenylphosphine and 14 mls. of BF₃-etherate and the solution was then stirred at 25° C. for 24 hours. Yield determined from the UV spectrum 68%. The phosphonium compound was reacted with vitamin A aldehyde. Yield 77%.

EXAMPLE 7

Preparation of SnCl₄ addition product of axerophtyl (triphenyl)phosphonium hydroxide 28.6 gms. (0.1 mol) of crystalline all-trans $\beta_{20}$-alcohol were dissolved in 500 mls. of chloroform at 25° C. 26.2 gms. of triphenylphosphine were added after which 11.7 mls. of anhydrous SnCl₄ were slowly added dropwise (in approximately 5 minutes) to the heterogeneous liquid while stirring. A homogeneous brown solution was immediately formed with a slight development of heat. The solution was stirred at 25° C. for 4 hours. Yield determined from the UV spectrum 100%.

EXAMPLE 8

Preparation of TiCl₄ addition product of $\beta_{15}$-(triphenyl-)phosphonium hydroxide 22 gms. of all-trans $\beta_{15}$-alcohol were dissolved in 400 mls. of absolute methanol. 26.2 gms. of triphenylphosphine were added to the solution while stirring after which 11 mls. of TiCl₄ were added to the resulting suspension in approximately 10 minutes with vigorous stirring. A strongly exothermal reaction occurred. The triphenylphosphine dissolved. After stirring for two hours at 25° C., the methanol solution was evaporated in vacuo to approximately 100 mls. after which 500 mls. of iso-octane were added slowly while stirring thoroughly. The phosphonium complex precipitated as a brown oily mass. The iso-octane was decanted and the complex was washed another two times with 500 mls. of iso-octane.

The complex was then dried in vacuo at maximally 30° C. in which it was obtained as a pale brown solid. Yield= 67 gms.=100%.

a: (275=272→$\epsilon$=18,250 (acid (0.01 N H₂SO₄) methanol).

a: (268)=270.

M.P. corrected, measured in vacuo=118–126° C.

EXAMPLE 9

Preparation of BF₃ addition product of Axerophthyl (triphenyl-)phosphonium-NaBH₄ reduction complex 28.4 gms. of crystalline all-trans $\beta_{20}$-aldehyde (0.1 mol) stirred with 1 gm. of NaBH₄ at 25° C. for 1 hour.

26.2 gms. of triphenylphosphine (0.1 mol) were added to the solution of the formed reduction complex and then 14 mls. of BF₃-etherate (0.1 mol) were added while vigorously stirring the heterogeneous reaction mixture. Stirring was continued for another 24 hours at 25° C. Yield (UV spectrum) 68%.

EXAMPLE 10

Preparation of BF₃ addition product of Axerophthyl (triphenyl-)phosphonium-DIBAH reduction complex 28.4 gms. of crystalline all-trans $\beta_{20}$-aldehyde were dissolved in 1 l. of absolute benzene at 25° C. and reduced with 20 mls. of DIBAH.

After stirring for 15 minutes were added successively 26.2 gms. of triphenylphosphine and 14 mls. of BF₃-etherate and the solution was stirred at 25° C. for 2 hours. Yield (from UV spectrum) 100%.

EXAMPLE 11

Preparation of axerophthylidene triphenylphosphonium-AlCl₃-complex 13.4 gms. of AlCl₃ (anhydrous) were dissolved in 500 mls. of anhydrous ethanol. 26.2 gms. of triphenylphosphine and 28.6 gms. of $\beta_{20}$-alcohol were added.

After 5′ shaking a substantially homogeneous brown solution was formed. The reaction mixture was stirred at room temperature for 24 hours. Yield (UV spectrum) 85%.

EXAMPLE 12

Preparation of BF₃ addition of axerophtylidene-triphenylphosphonium-NaBH₄ reduction complex 28.4 gms. of $\beta_{20}$-aldehyde and 0.95 gm. of sodium borohydride were dissolved in 800 mls. of absolute ethanol and stirred for 1 hour. 26.2 gms. of triphenylphosphine and 14 mls. of BF₃-diethyletherate were successively added to the solution of the reduction complex which had formed substantially quantitatively. The solution was stirred at room temperature for 24 hours. From the UV measurements of the reaction mixture it appeared that the phosphonium complex had formed for 94%.

EXAMPLE 13

Preparation of BF₃ addition product of $\beta$-ional triphenyl phosphonium hydroxide 38.8 gms. of $\beta$-ional and 55 gms. of triphenylphosphine were dissolved in 250 mls. of toluene and 28 mls. of BF₃-diethyletherate were added dropwise while stirring. The solution was stirred for 24 hours in which a white somewhat flocculous lower layer was formed. The upper layer was decanted and the lower layer was washed three times with 350 mls. of petroleum ether 40–60° C. The white, tough syrupy mass which is formed was dried in vacuo at 20° C. and a white crystalline substance was obtained.

Weight=103 gms.=73%.

a: (268 nm.)=145.5 in acid (0.01 NH₂SO₄) methanol. $\epsilon$=7,630.

M.P. corrected, measured in vacuo=57–64° C.

EXAMPLE 14

Preparation of BF₃ addition product of benzylidene (triphenyl)phosphonium hydroxide 26.2 gms. of triphenylphosphine and 100 mls. of benzylalcohol were transferred to a 250 mls. round-bottomed flask with reflux condenser. 14 mls. of $BF_3$-diethyletherate were added to the reaction mixture after which it was refluxed for 4 hours. The temperature of the reaction mixture was approximately 92° C. The benzylalcohol was then distilled off for the greater part (approximately 70 mls.) in vacuo (0.2 mm.) at approximately 80° C.

A solid weakly green coloured substance crystallized. At normal pressure it was refluxed for 10 minutes with 100 mls. of petroleum ether (boiling 60–80° C.), cooled, decanted and washed 6 times with 100 mls. of petroleum ether 60–80° C. at room temperature and decanted. The solid was then dried in vacuo at approximately 30°.

Weight (solid weakly pale yellow crystalline substance):=35 gms.=80% yield.

a: 268 nm. in acid (0.01 N $H_2SO_4$) metahanol=79.5. $\epsilon$=3,482.

M.P. corrected, measured in vacuo=180° (dec.).

EXAMPLE 15

Preparation $\beta_{18}$-(triphenyl) phosphonium $BF_3$-complex 6.50 gms. of $\beta_{18}$-ketol and 6.55 gms. of triphenyl-phosphine were dissolved in 250 mls. of benzene. 3.5 mls. of $BF_3$-diethyl etherate were added dropwise while stirring after which stirring was continued at room temperature for another 24 hours. The toluene was distilled off in vacuo at maximally 30° and the residue was washed with petroleum ether 40–60° C. (3×250 mls.) and dried in vacuo. The phosphonium complex was obtained as a yellow crystalline solid.

Weight=13.5 gms.=92%.

a: (312 nm.)=346. $\epsilon$=25.400 in acid (0,01 N $H_2SO_4$) methanol.

M.P. corrected, measured in vacuo=58–67° C. (dec.).

EXAMPLE 16

Preparation of $BF_3$ addition product of Axerophthyl tri-(p-methoxyphenyl)-phosphonium hydroxide 7.15 gms. (0.025 mol) of crystalline all-trans $O_{20}$-alcohol and 8.80 gms. (0.025 mol) of tri-(p-methoxyphenyl)-phosphine were dissolved in 200 mls. of anhydrous 1,2-dichloroethane at 60° C.

3.5 mls. (0.025 mol) of $BF_3$-etherate were added to the homogeneous solution with stirring and the homogeneous reaction mixture which was yellow to orange in colour was stirred under nitrogen at 60° C. for 3 hours. The solvent was then removed for the greater part (for approximately ⅞ part) in vacuo (10 cms.) by distilling off and 250 mls. of petroleum ether were added dropwise while stirring vigorously at 25° C. in approximately 20 minutes.

The $\beta_{20}$-phosphonium complex precipitated as a yellow oily viscous substance. The oil was washed three times with 100 mls. of petroleum ether and dried at 30° C. in vacuo (0.1 mm.). The $\beta_{20}$-phosphonium complex was obtained as a solid crystalline bright yellow substance.

Yield=17.1 gms.=96.5%.

a: (3.36)=432. $\epsilon$=30,600: acid (0.01 N $H_2SO_4$) methanol.

a: (252)=651. $\epsilon$=46,000: (acid (0.01 N $H_2SO_4$) methanol).

Melting point corrected, measured in vacuo=108–111°.

EXAMPLE 17

Preparation of $BF_3$ addition product of $\beta_{15}$-triphenylphosphonium DIBAH reduction complex 21.80 gms. of crude trans-$\beta_{15}$-aldehyde (content of trans-$\beta_{15}$-aldehyde=84.5%) were dissolved in 200 mls. of anhydrous petroleum ether.

The solution was reduced with 20 mls. of DIBAH (0.1 mol) and the petroleum ether was then removed at maximally 30° C. by distillation in vacuo (10 cm.) and replaced by 500 mls. of anhydrous 1,2 dichloroethane.

26.2 gms. (0.1 mol) of triphenylphosphine were added succeeded by 14 ml. (0.1 mol) of $BF_3$-etherate while stirring vigorously.

The solution was then stirred under nitrogen at 25° C. for three hours and then with 15.3 mls. of isopropanol (0.2 mol) for 10 minutes, after which the dichloroethane was evaporated in vacuo at approximately 25° to approximately ¼ part of the original volume.

500 mls. of petroleum ether were added dropwise slowly, (in aproximately 30 minutes) while stirring at 25° as a result of which the $\beta_{15}$-phosphonium complex precipitated as a light-brown solid.

The precipitate was filtered off by suction washed three times with 100 mls. of petroleum ether and dried in vacuo.

Yield: 49.5 gms.=85%.

$\epsilon(274)$=15,350 (acid (0.01 N $H_2SO_4$) methanol).

Melting point corrected, measured in vacuo=156–164°.

EXAMPLE 18

(a) 1.57 gms. (=0.005 mol) of crystalline all-trans-3-methoxy-$\beta_{20}$-aldehyde were dissolved in 50 mls. of absolute benzene and reduced with 1 ml. (=0.005 mol) of DIBAH. The solution was made up to 100 mls. with absolute benzene and 1.32 gms. of triphenylphosphine (=0.005 mol) and 0.7 ml. of $BF_3$-etherate (0.005 mol) were successively added while stirring. Stirring under nitrogen at 25° C. was continued for two hours after which 0.77 ml. (0.01 mol) of isopropanol was added and stirring was continued for another 10 minutes.

It was found from the UV spectrum of the reaction mixture that the aldehyde reduction complex was converted for approximately 85% into the corresponding phosphonium complex.

(b) 1.57 gms. of crystalline all-trans-3-methoxy-$\beta_{20}$-aldehyde were added to the reaction mixture and the mixture was stirred until a homogeneous solution was obtained. Then 10 mls. of methanol in which 2.5 gms. of KOH were dissolved were slowly added dropwise (in 10 minutes) while stirring vigorously. Stirring was continued for another 30 minutes after which the benzene layer was washed with:

1×250 mls. of 2 N HCl
1×250 mls. of water
1×250 mls. of 5% $NaHCO_3$
2×250 mls. of water.

It appeared from the UV-measurements of the benzene layer that the yield of 3,3'-dimethoxy-zeaxantine was 65% (calculated on 3-methoxy-$\beta_{20}$-aldehyde from which was started.)

EXAMPLE 19

Axerophthyl tri-(p-methylphenyl)-phosphonium $BF_3OH$ complex 7.15 gms. (0.025 mol) of crystalline all-trans-$\beta_{20}$-alcohol were dissolved in 200 mls. of absolute ethanol. 7.60 gms. (0.025 mol) of tri-(p-methyl-phenyl)-phosphine and 3.5 mls. of $BF_3$-etherate were successively added while stirring. After stirring for approximately 1 hour at 25° C., a pale yellow homogeneous solution was obtained. Stirring was continued under nitrogen at 25° C. for another 18 hours during which the phosphonium complex deposited as a crystalline pale yellow solid. The whole was cooled to −25° C. for 1 hour, after which the crystalline mass was filtered off by suction, washed 2 times with 25 mls. of cold (0° C.) ethanol and dried in vacuo at maximally 30°.

Yield=8.5 gms.=51.5%.

a: 338 (=816). $\epsilon$=53,800 (acid (0.01 N $H_2SO_4$) methanol).

a: 236=632.

Melting point corrected, measured in vacuo=211-214°.

It was found that the mother liquor contained another 5.2 gms. of phosphonium complex, so that the conversion into phosphonium complex had occurred for 83%.

The compound was dissolved in anhydrous ethanol. One equivalent vitamin A aldehyde and 10 gms. KOH in 50 mls. methanol was added. The yield of β-carotene was 100%.

EXAMPLE 20

The experiment of Example 1 was repeated in chlorobenzene. Yield phosphonium compound 96%, yield β-carotene 85% calculated on the phosphonium compound.

EXAMPLE 21

The phosphonium compound prepared in Example 5 was treated with 2 eq. of isopropanol. Subsequently vitamin A aldehyde was added. The mixture was processed as described in Example 1. Yield 91% calculated on the phosphonium compound.

What is claimed is:

1. A method of preparing a quaternary phosphonium compound of the Formula I

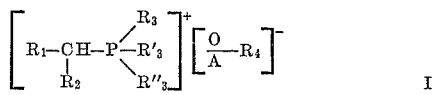

wherein $R_1$ is a member selected from the group consisting of α, β unsaturated alkenyl, cycloalkenyl and aralkenyl moieties and aryl and the phosphonium derivatives thereof, $R_2$ is a member selected from the group consisting of alkyl, cycloalkyl, aralkyl and aryl, olefinically unsaturated derivatives thereof and carboxyl, carbonyl, nitrile and hydroxyl substitution products thereof and hydrogen and the phosphonium derivatives thereof, $R_3$, $R'_3$ and $R''_3$ are each selected from the group consisting of alkyl, aryl, alkyl substituted aryl and alkoxy substituted aryl, $R_4$ is a member selected from the group consisting of hydrogen, acyl, [—Al(Alkyl)$_2$] and the metal containing radical produced during the reduction of esters, acids, aldehydes or ketones by a member selected from the group consisting of LiAlH$_4$, Mg(AlH$_4$)$_2$, Al(BH$_4$)$_3$, NaAl[CH$_2$CH(CH$_3$)$_2$]$_2$H$_2$, (C$_2$H$_5$O$_3$)$_3$AlH Li and (C$_2$H$_5$O)$_3$AlHNa and A is an electron acceptor, said method comprising reacting a compound of the Formula II

R'—CH—OR$_4$
|
R'$_2$   II wherein $R_4$ has the same meaning as in Formula I, R' and $R'_2$ having the same meanings as $R_1$ and $R_2$ with the proviso that any phosphonium moieties present on these radicals may be replaced by the moiety OR$_4$ with a phosphine of the formula

and an electron acceptor A.

2. A method of claim 1 wherein $R_4$ is —[Al(Alk)$_2$] wherein Alk is alkyl.

3. AA method as claimed in claim 2, characterized in that $R_4$ represents the group

—Al—[CH$_2$CH(CH$_3$)$_2$]$_2$

4. A method as claimed in claim 1, characterized in that as an electron acceptor a compound is used which is chosen from the group consisting of BF$_3$, SnCl$_4$, FeCl$_3$, AlCl$_3$, P$_2$O$_5$, CdCl$_2$, AlBr$_3$, ZnCl$_2$, PCl$_5$, HgCl$_2$, AlF$_3$, GaCl$_3$, B(CH$_3$)$_3$, CoCl$_3$, Ni$_2$O$_3$, V$_2$O$_5$, Cr$_2$O$_3$, BbCl$_5$ and SbF$_5$.

5. A method as claimed in claim 4, characterized in that an electron acceptor is used which is chosen from the group consisting of: BF$_3$, SnCl$_4$ and AlCl$_3$.

6. A method as claimed in claim 2, characterized in that the phosphine used is triphenylphosphine.

7. The method of claim 1 wherein R' is a conjugated polyene group.

8. The method of claim 7 wherein in the compound of the Formula II, $R'_2$ and R together with the carbon atom to which they are attached is a member of the group consisting of the polyene skeleton of a vitamin A, ionylidene and citrylidene and hydroxy, alkoxy and oxy nuclear substitution derivatives thereof.

9. A quaternary phosphonium compound of the Formula I

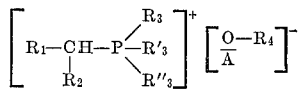

wherein $R_1$ is a member selected from the group consisting of α, β unsaturated alkenyl, cycloalkenyl and aralkenyl moieties and aryl and the phosphonium derivatives thereof, $R_2$ is a member selected from the group consisting of alkyl, cycloalkyl, aralkyl and aryl, olefinically unsaturated derivatives thereof and carboxyl, carbonyl, nitrile and hydroxyl substitution products thereof and hydrogen and the phosphonium derivatives thereof, $R_2$, $R'_3$ and $R''_3$ are each selected from the group consisting of alkyl, aryl, alkyl substituted aryl and alkoxy substituted aryl, $R_4$ is a member selected from the group consisting of hydrogen, acyl [—Al(Alkyl)$_2$] and the metal containing radical produced during the reduction of esters, acids, aldehydes or ketones by a member selected from the group consisting of LiAlH$_4$, Mg (AlH$_4$)$_2$, Al(BH$_4$)$_3$, NaAl [CH$_2$CH(CH$_3$)$_2$]$_2$H$_2$, (C$_2$H$_5$O$_3$)$_3$ AlH Li and (C$_2$H$_5$O)$_3$ AlHNa and A is an electron acceptor.

10. A compound of claim 9 wherein $R_4$ is a member selected from the group consisting of [—Al(Alkyl)$_2$] and the metal containing radical produced during the reduction of esters, acids, aldehydes or ketones by a member selected from the group consisting of

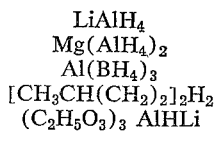

LiAlH$_4$
Mg(AlH$_4$)$_2$
Al(BH$_4$)$_3$
[CH$_3$CH(CH$_2$)$_2$]$_2$H$_2$
(C$_2$H$_5$O$_3$)$_3$ AlHLi and (C$_2$H$_5$O)$_3$ AlHN$_a$ 11. Compounds of Formula I as claimed in claim 9, in which $R_3$, $R'_3$, and $R''_3$ represent a phenyl group.

12. Compounds of Formula I as claimed in claim 10, in which formula $R_4$ is the group 13. Compounds of Formula I as claimed in claim 10, in which A is an electron acceptor selected from the group consisting of BF$_3$, SnCl$_4$, FeCl$_3$, AlCl$_3$, P$_2$O$_5$, CdCl$_2$, AlBr$_3$, ZnCl$_2$, TiCl$_4$, PCl$_5$, HgCl$_2$, AlF$_3$, GaCl$_3$, BCl$_3$, B(CH$_3$)$_3$, CoCl$_3$, Ni$_2$O$_3$, V$_2$O$_5$, Cr$_2$O$_3$, SbCl$_5$ and SbF$_5$.

14. Compounds of Formula I as claimed in claim 13, in which A is an electron acceptor chosen from the group consisting of BF$_3$, SnCl$_4$, and AlCl$_3$.

15. A boron-trifluoride compound of claim 9 wherein the boron-trifluoride addition trifluoride compound is the boron-trifluoride compound of axerophthyl triphenyl phosphonium hydrixide.

16. A boron-trifluoride compound of claim 14 wherein the boron-trifluoride addition trifluoride compound is the borin-trifluoride compound of axerophthyl triphenyl phosphonium acetate.

17. An aluminium chloride compound of claim 14 wherein the aluminium chloride addition compound is the aluminium chloride compound of axerophthyl triphenyl phosphonium hydroxide.

18. A stannic chloride compound of claim 14 wherein the stannic chloride addition compound is the stannic 19. A titaniumchloride compound of claim 13 wherein the titaniumchloride addition compound is the titaniumchloride addition compound of β-ionylidene ethyl triphenyl phosphonium hydroxide.

20. A boron-trifluoride compound of claim 14 wherein the boron-trifluoride addition compound is the boron-trifluoride addition compound of β-ionyl triphenyl phosphonium hydroxide.

21. A boron-trifluoride compound of claim 14 wherein the boron-trifluoride addition compound is the boron-trifluoride addition compound of benzylidene triphenyl phosphonium hydroxide.

22. A boron-trifluoride compound of claim 14 wherein the boron-trifluoride addition compound is the boron-trifluoride addition compound of axerophthyl tri-(p.methoxy-phenyl) phosphonium hydroxide.

23. A boron-trifluoride compound of claim 14 wherein the boron-trifluoride addition compound is the boron-trifluoride addition compound of axerophthyl tri-(p.methyl-phenyl) phosphonium hydroxide.

24. A compound of claim 9 wherein $R_1$ is conjugated polyene group.

25. A compound of claim 24 wherein $R_1$ and $R_2$ together with the carbon atom to which they are attached is a member of the group consisting of the polyene skeleton of vitamin A, citrylidene and ionylidene and hydroxy, alkoxy and oxy nuclear substitution derivatives thereof.

26. A boron trifluoride compound of claim 14 wherein the boron-trifluoride addition compound is the boron-trifluoride compound of 8-(2,6,6-trimethylcyclohexen-1-yl - 1)6-methyl-octa-3,5,7-trienyl-triphenyl phosphonium hydroxide.

27. A boron-trifluoride compound of claim 14 wherein the boron-trifluoride addition compound is the boron-trifluoride addition compound of axerophthyl triphenyl-phosphonium $OR_4$ compound wherein $R_3$ is phenyl, $R'_3$ is phenyl, $R''_3$ is phenyl, $R_4$ is diisobutyl aluminum and A is boron trifluoride.

28. A boron-trifluoride compound of claim 14 wherein the boron-trifluoride addition compound is the boron-trifluoride addition compound of axerophthyl triphenyl phosphonium $LiAlH_4$ reduction product wherein $R_3$ is phenyl, $R'_3$ is R phenyl, $R''_3$ is phenyl, $R_4$ is the lithium and aluminum containing radical produced during the reduction of esters, acids, aldehydes or ketones with $LiAlH_4$ and A is boron trifluoride.

29. A boron-trifluoride compound of claim 14 wherein the boron-trifluoride addition compound is the boron-trifluoride addition compound of axerophthyl triphenyl phosphonium $NaBH_4$ reduction product wherein $R_3$ is phenyl, $R'_3$ is phenyl, $R''_3$ is phenyl, $R_4$ is the sodium and boron containing radical produced during the reduction of esters, acids, aldehydes, or ketones with $NaBH_4$ and A is boron trifluoride.

30. A boron-trifluoride compound of claim 14 wherein the boron-trifluoride addition compound is the boron-trifluoride addition compound of $β_{15}$-triphenyl phosphonium $OR_4$ compound wherein $R_3$ is phenyl, $R'_3$ is phenyl, $R''_3$ is phenyl, $R_4$ is diisobutyl aluminum and A is boron trifluoride.

31. A boron-trifluoride addition compound of claim 14 wherein the boron-trifluoride addition compound is the boron-trifluoride addition compound of 3-methoxy-axerophthyl triphenyl phosphonium $OR_4$ compound wherein $R_3$ is phenyl, $R'_3$ is phenyl, $R''_3$ is phenyl, $R_4$ is diisobutyl aluminum and A is boron trifluoride.

References Cited

UNITED STATES PATENTS

| | | |
|---|---|---|
| 2,842,599 | 7/1958 | Isler et al. |
| 2,913,498 | 11/1959 | Ramsden. |
| 2,950,321 | 8/1960 | Sarnecki et al. |
| 3,006,939 | 10/1961 | Pommer et al. 260—606.5P XR |
| 3,015,680 | 1/1962 | Isler et al. |
| 3,259,541 | 7/1966 | Schröder et al. __ 260—429.7 XR |
| 3,294,844 | 12/1966 | Sarnecki et al. |
| 3,311,656 | 3/1967 | Surmatis. |
| 3,330,868 | 7/1967 | Grisley. |
| 3,347,932 | 10/1967 | Chechak. |
| 3,373,207 | 3/1968 | Nuerrenbach et al. __ 260—606.5 |

OTHER REFERENCES

Angew. Chemie, vol. 77, pp. 277–282 (1965).
Chemical Abstracts, vol. 60, p. 1806 (1964).
Krajkeman, Manufacturing Chemist, vol. 22, pp. 147–150 (1951).
Milas et al., J. Amer. Chem. Soc., vol. 69, p. 2247, col. 2 and p. 2248, col. 1 (1947).

TOBIAS E. LEVOW, Primary Examiner

H. M. S. SNEED, Assistant Examiner

U.S. Cl. X.R.

260—429.7, 540, 439, 448, 429, 429.9, 431, 606.5, 438.5, 446, 666, 632

UNITED STATES PATENT OFFICE
CERTIFICATE OF CORRECTION

Patent No. 3,513,181 (PHN 1637)   Dated   May 19, 1971

Inventor(s)   AART NOORDERMEER ET AL

It is certified that error appears in the above-identified patent and that said Letters Patent are hereby corrected as shown below:

Column 4, line 74, "0.024" should read -- (0.025 --.
Column 6, line 9, after "(0.1 mol)" insert -- were dissolved in 300 mls. of absolute ethanol and --.
   line 41, after "addition" insert -- product --.
   lines 55 and 57, "ional" should read -- ionol --.

Column 7, line 41, "$O_{20}$" should read -- $\emptyset_{20}$ --.

Column 9, line 64, "AA" should read -- A --.
   line 73, "BbCl$_5$" should read -- SbCl$_5$ --.

Column 10, line 8, "R" should read -- R' --.
   line 42, after "liAlH$_4$" insert a comma (--,--).
   line 43, after "Mg(AlH$_4$)$_2$" insert a comma (--,--).
   line 44, after "Al(BH$_4$)$_3$" insert a comma (--,--).
   line 45, cancel this line and rewrite as follows:
      -- NaAl[CH$_2$CH(CH$_3$)$_2$]$_2$H$_2$,--.
   line 53, after "group" insert -- -Al- [CH$_2$CH(CH$_3$)$_2$]$_2$--.
   line 67, after "addition" cancel "trifluoride"
   line 68, change "borin" to -- boron --.

Signed and sealed this 23rd day of March   1971.

(SEAL)
Attest:

EDWARD M. FLETCHER, JR.
Attesting Officer

WILLIAM E. SCHUYLER, JR.
Commissioner of Patents